June 23, 1936.    J. E. ALLEN ET AL    2,045,115
REFUSE DESTRUCTOR
Filed July 3, 1930    3 Sheets-Sheet 1

INVENTORS
John E. Allen, Michael J. Blew & Albert C. Wood
BY

ATTORNEY

Patented June 23, 1936

2,045,115

UNITED STATES PATENT OFFICE 2,045,115

REFUSE DESTRUCTOR

John E. Allen, Michael J. Blew, and Albert C. Wood, Philadelphia, Pa.

Application July 3, 1930, Serial No. 465,565

6 Claims. (Cl. 110—15)

Our invention is designed to provide improved means for the dehydration and incineration of refuse and the utilization of the heat generated by such incineration for gradually drying further refuse as it passes over revoluble dryers through which water is circulated in a closed cycle.

In accordance with our improvements, garbage, sewage, sludge or other refuse is discharged from suitable hoppers into an upright setting or flue in which are disposed revoluble dryers mounted in hollow headers and having adjacent thereto baffles or deflectors so positioned as to cause the refuse material to be translated in a thin coating over a large arc of the dryers preferably before discharge thereof to the next dryer. Scrapers are also provided for dislodging from the dryers any adherent material. The dryers, headers and scrapers are protected against excessive temperatures of the direct heat by a stream of cooling water which flows upwardly through the scrapers and discharges at a point adjacent to the tops of the headers which are connected by a drum having a port above the bottom thereof through which water overflows into hollow shafts on which the dryers are mounted and steam generated in the dryers is discharged to the drum. The dryer shafts are perforated within the dryers so as to permit flow of water into the dryers and flow of steam into the shafts, and any overflow from the bottom dryer is returned to a feed water tank for re-circulation. The steam generated in the apparatus is collected in the upper drum and passes therefrom to a condenser or heat exchanger from which the condensate is discharged to the feed water tank.

The refuse is dehydrated by its passage over the dryers both by the heat thereof and by the upflowing gases from a furnace and is discharged to a grate, preferably a traveling grate, onto which fuel for supporting or accelerating combustion is discharged from a hopper. The ash may be discharged from the end of the grate through a suitable discharge passage. The gaseous products of combustion after drying the refuse are preferably passed through a deodorizer such as a secondary furnace or combustion chamber or through a scrubber in which they are washed and deodorized before discharge to the atmosphere. Preferably a fan or blower is provided to insure adequate draught when a scrubber is employed.

The characteristic features and advantages of our improvements will further appear from the following description and the accompanying drawings showing an illustrative embodiment thereof.

Figure 1:
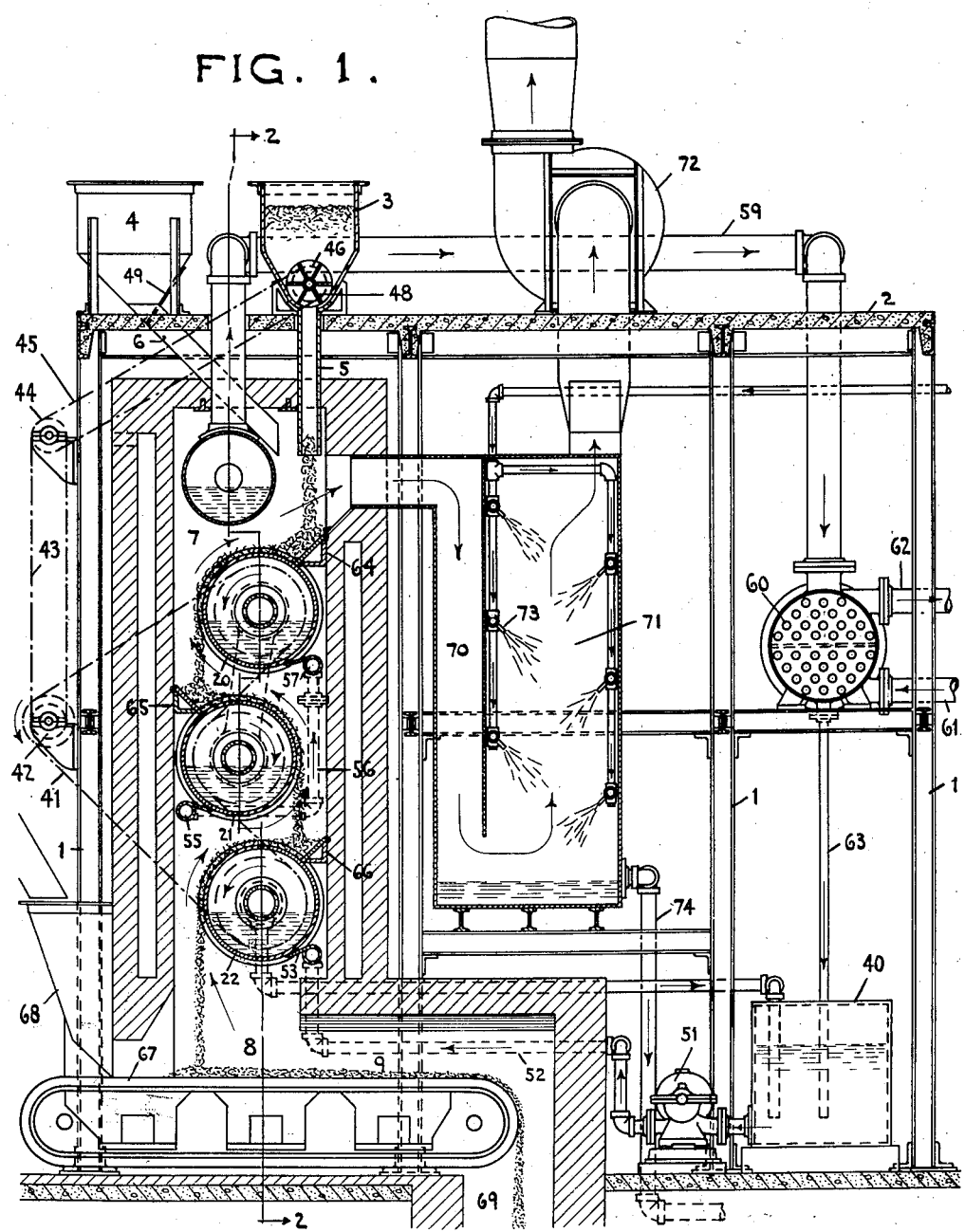
Figure 1:
Figure 2:
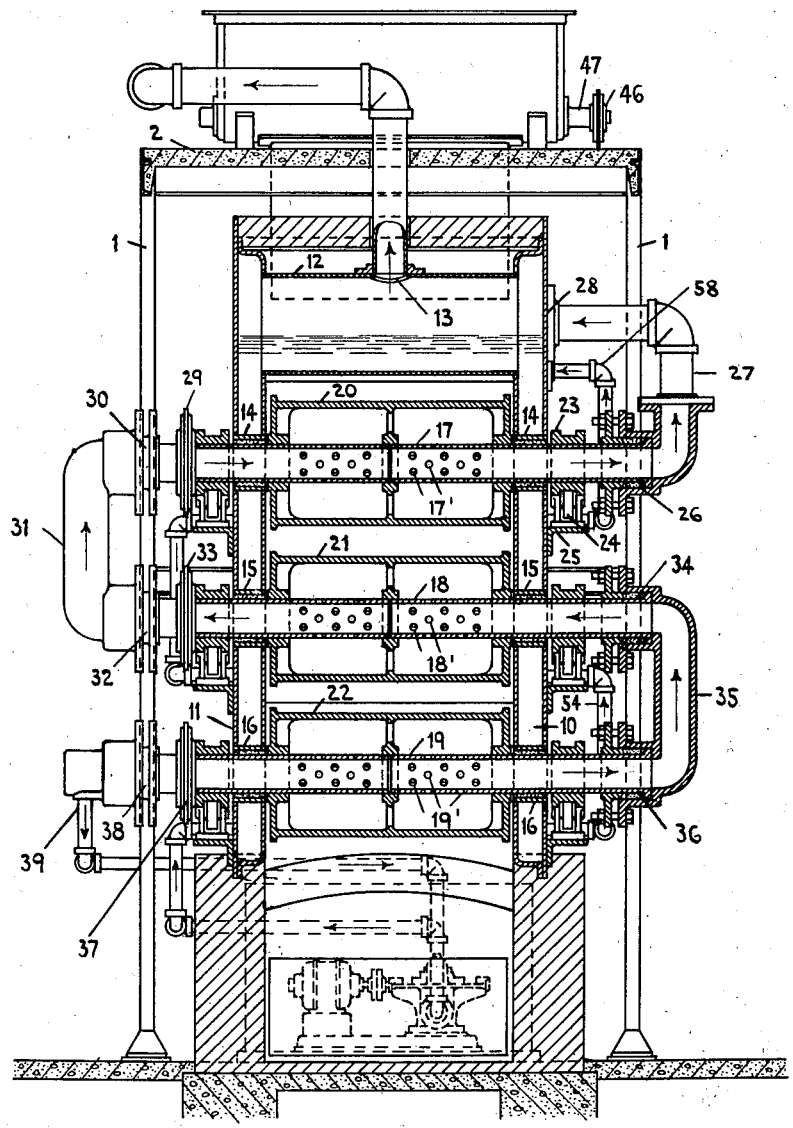
Figure 3:
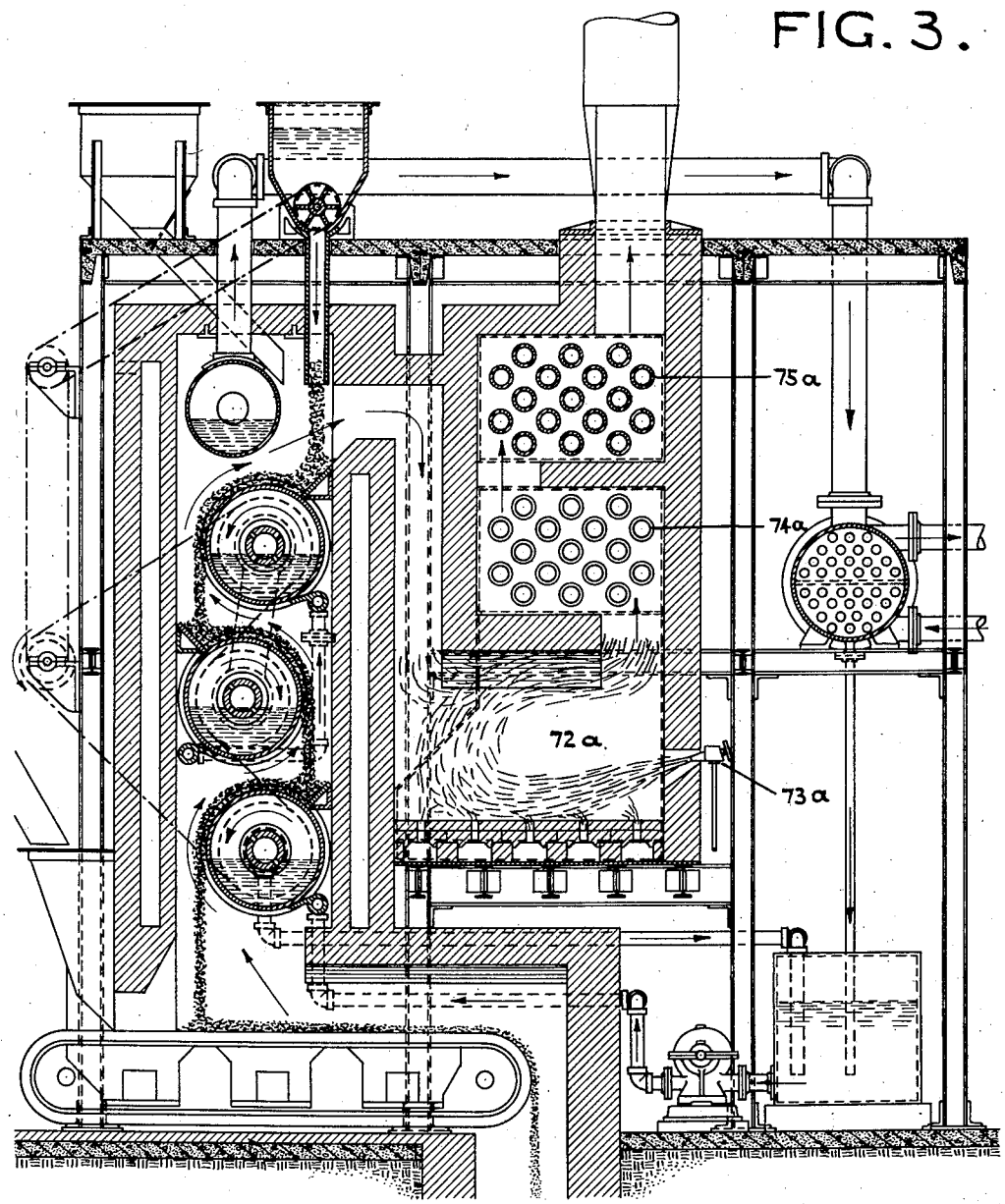

In the drawings, Fig. 1 is a longitudinal sectional view of a destructor embodying our improvements; Fig. 2 is a transverse sectional view thereof taken on the line 2—2 of Fig. 1; and Fig. 3 is a longitudinal sectional view showing the substitution of a secondary furnace deodorizer for the scrubber of Fig. 1.

As illustrated in the drawings, a structural iron framework 1 supports a platform or roof 2 and carries a plurality of hoppers 3 and 4 discharging through chutes or ducts 5 and 6 to the interior of a flue or setting 7 communicating with a combustion chamber 8 of a furnace 9. The furnace and setting are housed within the framework 1, and the walls of the furnace and the front and rear walls and roof of the setting may be built of metal, brick or other suitable refractory material.

The sides of the setting are preferably enclosed by hollow headers 10 and 11 preferably built up of shaped metal plates, and the upper portions of the headers are connected with a drum 12 having a steam outlet 13.

The headers are provided with sleeves 14, 15 and 16 through which, concentrically with the sleeves, extend hollow shafts 17, 18 and 19, on which are fixed the respective drums or dryers 20, 21 and 22. The ends of the shafts 17 which project from the headers have fixed thereto the wheels 23 rotating on the antifriction rollers 24 supported upon brackets 25 attached to the headers. The respective shafts communicate with the respective drums fixed thereon through the apertures 17', 18' and 19'. One end of the shaft 17 is connected through a packed joint 26 with the conduit 27 communicating through the port 28 with the drum 12 above the bottom thereof. The opposite end of the shaft 17 has fixed thereto a pulley or sprocket 29 and communicates through the packed joint 30 with a conduit 31 which communicates through the packed joint 32 with a shaft 18 which has fixed thereto the pulley or sprocket 33. The opposite end of the shaft 18 communicates through the packed joint 34 with the bent conduit 35 which is connected by means of the packed joint 36 with the shaft 19. The shaft 19 has fixed thereto a pulley or sprocket 37 and is connected by means of the packed joint 38 with a return tube 39 discharging into the water tank 40. The pulleys 29, 33 and 37 are rotated in the direction of the arrow shown in Fig. 1 by a belt or sprocket chain 41 driven from a shaft or motor 42. By varying the speed of the motor, or interposing suitable change speed mechanism, not shown, the rate of feed of the refuse may be varied to effect a desired degree of dehydration. The power shaft 42 also drives through the belt or sprocket chain 43, pulley 44, sprocket chain 45, pulley 46, and shaft 47 the rotary feeder 48 in the hopper 3 whereby regulated charges are fed at any desired rate from the hopper through the duct 5 into the flue 7. The hopper 4 may be provided with a similar feeder or the discharge therefrom may be controlled by a slide gate 49.

The water in the tank 40 is pumped by the feed pump 51 through the pipe 52 to the water cooled scraper 53 which bears against the dryer 22. The water discharged from the scraper 53 passes through the pipe 54 to the water cooled scraper 55 which bears against the dryer 21. The water passing from the scraper 55 flows through the pipe 56 to the water cooled scraper 57 bearing against the surface of the dryer 20, and the water discharged from this scraper 57 is discharged through the pipe 58 into the right hand header (Fig. 2) adjacent to the bottom of the drum 12.

The water thus pumped to the headers rises therein and in the drum 12 until the opposite header is filled and the water level is adjacent to the bottom of the port 28 through which the surplus water flows through the pipe 27 and shaft 17 into the drum 20. When the drum 20 is filled up to the level of the shaft 17, the water flows through the pipe 31 and shaft 18 into the drum 21 until the latter is filled up to the level of the shaft 18. The water then flows through the pipe 35 and shaft 19 into the drum 22, and when the latter is filled up to the level of the shaft the excess passes through the overflow pipe 39 back to the tank 40. The steam generated in the drums 22, 21 and 20 escapes through the apertures in the respective shafts and flows upward into the steam collecting drum 12 from which it passes through the port 13 and conduit 59 into the heat exchanger or condenser 60 where the steam is condensed by cooling fluid circulated through the pipes 61 and 62. The condensate then passes through the pipe 63 to the tank 40.

The refuse discharged from the hoppers 3 and 4 falls upon the dryer 20 and the baffle or deflector 64 positioned between the periphery of the dryer and the front wall of the flue. Such refuse is conveyed by the rotating dryer and partially dried by the heat thereof and drops upon the dryer 21 and baffle or deflector 65 disposed between the drum and the back wall of the flue. The refuse is further dried as it is translated by the drum 21 and drops upon the dryer 22 and baffle or deflector 66 disposed between the periphery of the dryer 22 and the forward wall of the flue.

The drying of the refuse is substantially completed as it is moved by the heated drum 22 and it then drops in suitable and distributed condition for burning upon the traveling grate 67 to which fuel may be fed from the hopper 68 and from which ash is discharged into the discharge passage 69.

As shown in Fig. 1, the products of combustion are drawn upward through the flue 7 downward through the flue 70 and upward through the scrubber chamber 71 by a fan or blower 72, and during the passage of the spent gases through the scrubber chamber they are washed and deodorized by the sprays or jets 73. The water collected in the bottom of the scrubber chamber may be discharged through a suitable overflow pipe 74 to waste.

As illustrated in Fig. 3, the products of combustion discharged from the flue 70 are drawn down through the passage 71a and into the secondary combustion chamber 72a where the gases are deodorized by the flame from the burner 73a. The combined products of combustion may have a portion of the heat absorbed therefrom by the economizer elements 74a and 75a before being discharged through the stack.

By our improvements but little fuel, water or power is required for the destruction of the refuse and the apparatus is kept in good condition automatically by protection of the elements subject to deterioration by means of water which can be continuously re-circulated and which therefore deposits a minimum of scale or precipitate. The rotation of the dryer cylinders and the action of the scrapers agitates, turns over and breaks up the refuse so as to expose a maximum surface to the dehydrating action of the gases and cylinders and insuring thorough drying throughout the mass. By varying the rate of feed and the speed of rotation of the drums, the drying time may be adjusted to the original moisture content of the refuse; or the speed of rotation of the drums may be varied independently of the rate of feed by driving the pulleys 42 and 44 independently.

Having described our invention, we claim:

1. Apparatus of the character described comprising a rotary dryer, a scraper adjacent to said dryer, means for supplying a cooling medium to said scraper, a receptacle through which said cooling medium is discharged from said scraper, and means for supplying the cooling medium from said receptacle to said dryer.

2. Apparatus of the character described comprising a series of rotatable dryers, means for rotating said dryers, scrapers adjacent to said dryers, means supplying water to said scrapers, a receptacle to which water from said scrapers is discharged, means for supplying water from said receptacle to said dryers and passing steam from said dryers to said receptacle, and means for condensing steam collected in said receptacle.

3. Apparatus of the character described comprising a furnace containing a combustion chamber, a traveling grate in said combustion chamber, means for supplying fuel to said grate, a flue communicating with said combustion chamber, a plurality of revoluble dryers in said flue, headers at the ends of said dryers, scrapers in said flue adjacent to the bottoms of said dryers, baffles in said flue adjacent to the tops of said dryers, a drum connecting said headers, a hopper discharging to the upper portion of said flue, means for supplying water to said headers, drum and dryers, a condenser to which said drum discharges, and a receptacle to which said condenser discharges and from which water is supplied to said headers, drum and dryers.

4. An incinerator comprising a flue structure including hollow side-wall headers, a plurality of hollow rotatable dryers journalled in, and between, the headers, a hollow scraper for each dryer, a hollow stationary drum disposed between, and communicating with, the headers, and means for circulating water successively through the scrapers to the headers and drum and through the dryers in the order named.

5. An incinerator comprising a hollow rotatable drum, a baffle element for directing material to the drum, an element for scraping the drum, one of said elements being hollow, and means for circulating water through the drum and the hollow element.

6. An incinerator comprising a structure providing a flue, means for heating the flue, apparatus for conducting material through the flue including a hollow member, means including a supply tank for circulating water through the hollow member, and means including a condenser communicating with the hollow member for collecting steam and returning it as water to the tank.

JOHN E. ALLEN.
MICHAEL J. BLEW.
ALBERT C. WOOD.